(12) United States Patent
Olson et al.

(10) Patent No.: US 9,618,938 B2
(45) Date of Patent: Apr. 11, 2017

(54) FIELD-BASED TORQUE STEERING CONTROL

(71) Applicants: Ford Global Technologies, LLC, Dearborn, MI (US); The Regents of the University of Michigan, Ann Arbor, MI (US)

(72) Inventors: Edwin Olson, Ann Arbor, MI (US); Enric Galceran, Zurich (CH); Ryan M. Eustice, Ann Arbor, MI (US); James Robert McBride, Saline, MI (US)

(73) Assignees: FORD GLOBAL TECHNOLOGIES, LLC, Dearborn, MI (US); THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 14/814,856

(22) Filed: Jul. 31, 2015

(65) Prior Publication Data
US 2017/0031362 A1 Feb. 2, 2017

(51) Int. Cl.
*G05D 1/00* (2006.01)
*G06K 9/00* (2006.01)
*G05D 1/02* (2006.01)

(52) U.S. Cl.
CPC ... *G05D 1/0212* (2013.01); *G05D 2201/0213* (2013.01)

(58) Field of Classification Search
USPC ............................................ 701/41; 382/104
See application file for complete search history.

(56) References Cited

U.S. PATENT DOCUMENTS

| | | | | |
|---|---|---|---|---|
| 6,393,362 B1* | 5/2002 | Burns | ................. | G05D 1/0278 340/940 |
| 7,295,906 B2 | 11/2007 | Asano | | |
| 8,249,777 B2 | 8/2012 | Greul | | |
| 8,457,359 B2* | 6/2013 | Strauss | ................. | B60W 30/09 382/104 |
| 2009/0030605 A1* | 1/2009 | Breed | ................. | B60N 2/2863 701/532 |
| 2009/0271071 A1* | 10/2009 | Buerkel | ............. | B60T 8/17557 701/41 |
| 2010/0228438 A1* | 9/2010 | Buerkle | ............... | B62D 15/025 701/41 |

(Continued)

FOREIGN PATENT DOCUMENTS

CN 102591332 B 8/2014

OTHER PUBLICATIONS

Krogh, B.H., Integrated Path Planning and Dynamic Steering Control for Autonomous Vehicles, www.researchgate.net/publication/3979348, Mar. 24, 2015.

*Primary Examiner* — Tyler Paige
(74) *Attorney, Agent, or Firm* — Frank A. MacKenzie; Bejin Bieneman PLC

(57) ABSTRACT

A system includes a computer programmed to determine, along a nominal path to be traversed by a vehicle, a potential field representing a driving corridor for the vehicle. The computer is further programmed to identify a position of the vehicle relative to the potential field at a current time, and apply a torque to q steering column of the vehicle. The torque is based at least in part on the position. The potential field includes an attractive potential that guides the vehicle to remain within the corridor.

24 Claims, 16 Drawing Sheets

(56) References Cited

U.S. PATENT DOCUMENTS

| | | | |
|---|---|---|---|
| 2011/0035086 A1* | 2/2011 | Kim | G05D 1/0238 |
| | | | 701/23 |
| 2011/0044507 A1* | 2/2011 | Strauss | B60R 21/0134 |
| | | | 382/103 |
| 2012/0083947 A1* | 4/2012 | Anderson | B60W 30/09 |
| | | | 701/3 |
| 2012/0221168 A1 | 8/2012 | Zeng | |
| 2015/0057835 A1 | 2/2015 | Streubel | |
| 2015/0158528 A1* | 6/2015 | Moshchuk | B62D 15/0265 |
| | | | 701/41 |
| 2015/0166069 A1* | 6/2015 | Engelman | B60W 30/12 |
| | | | 701/23 |
| 2016/0207534 A1* | 7/2016 | Nishimura | B60W 50/14 |

* cited by examiner

FIELD-BASED TORQUE STEERING CONTROL

BACKGROUND

Autonomous vehicles may be steered to track a centerline of a path by adjusting a steering angle of the vehicle. This differs from typical human driving behavior, which takes into account self-aligning torques exerted on the steering column during driving maneuvers, and also typically allows for more deviation from a centerline.

DRAWINGS

DETAILED DESCRIPTION

Overview

Steering an autonomous vehicle using potential fields and torque steering control allows the vehicle to deviate from a nominal path within a defined corridor, and more nearly approximates human driving. The field-based torque steering system defines a potential field representing the driving corridor for the vehicle along a nominal path to be travelled by the vehicle. The system identifies a pose of the vehicle relative to the potential field at a current time. A "pose of the vehicle" includes at least a position of the vehicle at a particular time, and may further include additional information related to the vehicle such as a direction of travel of the vehicle, a velocity of the vehicle, an acceleration of the vehicle, etc., at the particular time. The system determines, based on the vehicle pose, relative to the potential field, a torque to be applied to a steering column of the vehicle. The potential field includes an attractive potential that directs the vehicle to remain within the corridor.

As shown by test results, such a field-based torque steering system may result in a similar tracking to that of steering wheel angle (SWA) steering systems that are currently under development for autonomous vehicles, while using less work (measured in Joules) to steer the vehicle. This may result in a driving experience which has a more natural feel, similar to that of a vehicle being driven by a person.

Exemplary System Elements

Figure 1:
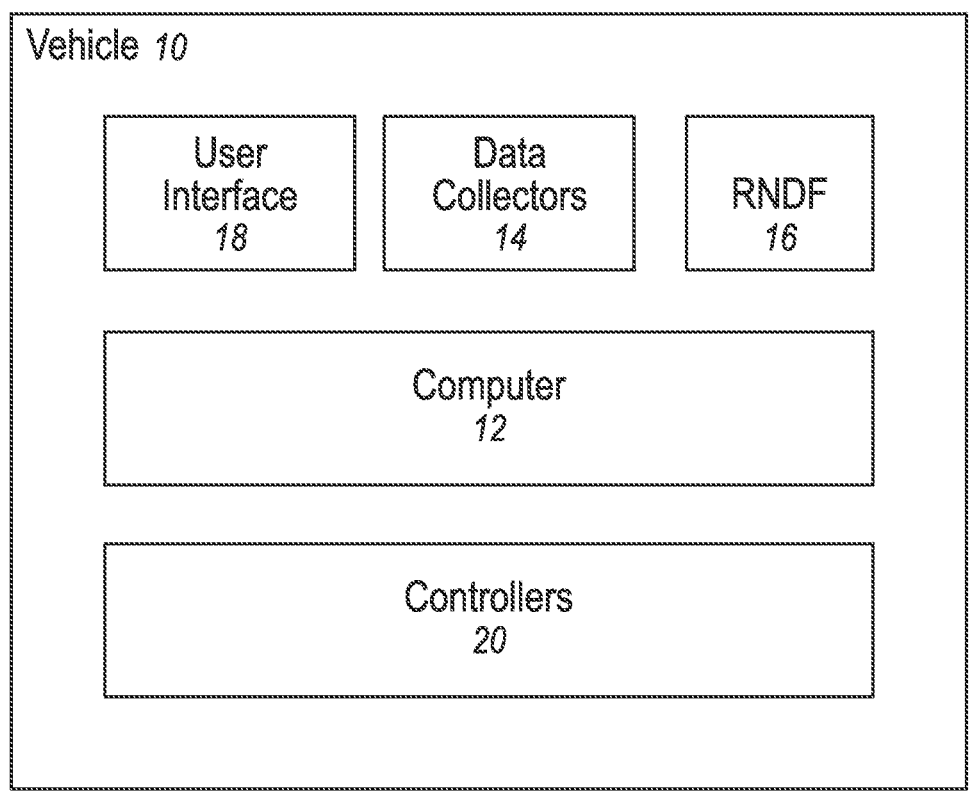
FIG. 1 is a diagram of an exemplary vehicle including potential field-based torque steering control.

An exemplary vehicle 10 including a computer 12 programmed to use potential fields and torque control to steer the vehicle 10 is shown in FIG. 1. The vehicle 10 includes the computer 12, a memory of which stores a road network definition file (RNDF) 16, one or more data collectors 14, a user interface 18, and one or more controllers 20. The vehicle 10 is generally a land-based vehicle having three or more wheels, e.g., a passenger vehicle, light truck, etc. The vehicle 10 has a front, a rear, a left side and a right side, wherein the terms front, rear, left and right are understood from the perspective of an operator of the vehicle 10 seated in a driver's seat in a standard operating position, i.e., facing a steering wheel.

The vehicle 10 computer 12 generally includes a processor and a memory, the memory including one or more forms of computer-readable media, and storing instructions executable by the processor for performing various operations, including as disclosed herein. Further, the vehicle 10 computer 12 may include and/or be communicatively coupled to one or more other computing devices included in the vehicle 10 for monitoring and/or controlling various vehicle components e.g., electronic control units (ECUs)

such as controllers 20. The vehicle 10 computer 12 is generally programmed and arranged for communications on a controller area network (CAN) bus or the like.

The vehicle 10 computer 12 may also have a connection to an onboard diagnostics connector (OBD-II), a CAN (Controller Area Network) bus, and/or other wired or wireless mechanisms. Via one or more such communications mechanisms, the computer 12 may transmit messages to various devices in a vehicle 10 and/or receive messages from the various devices, e.g., actuators, sensors, etc., including data collectors 14 and controllers 20. Alternatively or additionally, in cases where the vehicle 10 actually comprises multiple devices, the CAN bus or the like may be used for communications between devices represented as the computer 12 in this disclosure. In addition, the computer 12 may be configured for communicating with other devices via various wired and/or wireless networking technologies, e.g., cellular, Bluetooth, a universal serial bus (USB), wired and/or wireless packet networks, etc.

A memory of the computer 12 generally stores collected data. Collected data may include a variety of data collected in the computer 12 by data collectors 14 and/or derived therefrom. Collected data may further include data received via communications e.g., with sources external to the vehicle 10. Examples of collected data may include data related to the vehicle 10 such as a location of objects, a type of objects, a location and speed of other vehicles, road features, etc. in an area that the vehicle 10 is operating. The collected data may further include data regarding vehicle status such as speed of the vehicle 10, direction of travel of the vehicle 10, torque applied to a steering column, engine speed, etc. Further, the data may include, e.g., location data received from a global positioning system (GPS), or map data of an area in which the vehicle 10 is operating or is planning to operate. In general, the collected data may include any data that may be gathered by the data collectors 14, received through vehicle-to-vehicle (V2V) or vehicle-to-infrastructure (V2I) communications, received through satellite communications, collected or received from other sources, and/or computed from such data.

The computer 12 may further be programmed to collect data regarding goals of the vehicle 10 and other data related to the vehicle 10. As used herein, a "goal" of the vehicle 10 refers to objectives of a trip, such as an ultimate destination, intermediate destinations, a route to be traveled, a preferred time of arrival, a driving style (conservative, sporty) to be used, etc.

For example, the computer 12 may receive input from the user via the user interface 18 indicating the destination of the user and the route the user would like to take. Based on the collected data, as described below, the computer 12 may plan a nominal path to a desired destination in terms of driving directions on a roadway map. The computer 12 may further define a corridor of acceptable deviation around the nominal path. Based on the defined corridor, the computer 12 may determine and send commands to vehicle controllers 20 to control the vehicle 10 to travel along the nominal path and within the corridor, by adjusting a torque applied to a vehicle steering column.

Generally, each controller 20 may include a processor programmed to receive instructions from the vehicle 10, execute the instructions, and send messages to the computer 12. An electronic control unit (ECU), such as is known, and moreover having programming for operating as described herein, is an example of a controller 20. Further, each of the controllers 20 may include or be communicatively coupled to an actuator or the like that is provided to actuate a vehicle component, e.g., brakes, steering, throttle, etc. For example, a torque controller 20 may include a processor and a motor for applying torque to a steering column. In this example, upon receiving an instruction from the computer 12, the processor may activate the motor in order to adjust the steering of the vehicle 10.

Further, the controllers 20 may each include sensors or otherwise operate as data collectors 14 to provide data to the computer 12 regarding vehicle 10 speed, steering angle, height of a suspension, etc. For example, the torque controller 20 may send data to the computer 12 corresponding to the torque being applied to the steering column.

Data collectors 14 may include a variety of devices. For example, data collectors 14 may include LIDAR, radar, video cameras, ultrasonic sensors, infrared sensors for sensing the environment. Data collectors 14 may further include components that collect dynamic vehicle 10 data, such as velocity, yaw rate, steering angle, etc. Further, the foregoing examples are not intended to be limiting. Other types of data collectors 14, for example accelerometers, gyroscopes, pressure sensors, thermometers, barometers, altimeters, etc., could be used to provide data to the vehicle 10.

A road network definition file (RNDF) 16 may include encoded topological-metric maps of the road networks where the vehicle 10 may be operating. The topological-metric maps include latitude and longitude coordinates for road features and other objects in the environment and are encoded based on a derivative of the RNDF file format. The RNDF 16 may supply map data, e.g., to the computer 12.

The vehicle 10 may further include a user interface 18 that may be included in or communicatively coupled to the vehicle 10. The user interface 18 can be used, e.g., to receive input from a user regarding the desired destination of the vehicle 10, the desired route to take, etc. The interface 18 may include one or more output devices such as a display, speakers, etc. for communicating information to a user. The interface 18 may further include one or more input devices such as a touch screen display, a keyboard, a gesture recognition device, switches, etc., for receiving input from the user.

Processes

A field-based torque steering system for controlling a vehicle 10 along a nominal path 30 may include a corridor 32 around the path 30 and a steering controller 20 that uses a torque based interface. The corridor 32 may be constructed of potential fields 34 that guide the vehicle 10 along the nominal path 30. The potential fields 34 may include a steering component that guides the vehicle 10 towards the nominal path 30 and an obstacle component that guides the vehicle 10 away from obstacles, e.g., static objects, other vehicles, etc., within a predetermined distance of the nominal path 30. The predetermined distance may be defined, for example, as within a fixed lateral distance, e.g., 20 meters, from the nominal path. As another example, the predetermined distance may be defined as within the corridor represented by the potential field. As another example, the predetermine distance may be a distance related to a status of the vehicle (position, velocity, acceleration, etc.) and/or related to conditions in the environment (type of road, weather conditions, etc.). The steering controller 20 may apply a torque to a steering column which is determined based on a position and/or future projected position of the vehicle 10 relative to the potential field 34.

Constructing a Potential Field

A potential field 34 to represent the vehicle's 10 driving corridor 32 may be constructed by means of a potential energy function U: $\mathbb{R}^2 \to \mathbb{R}$:

$$U_{(x)} = U_{att} + U_{rep} \quad (1)$$

where x is a point on a two-dimensional plane of the vehicle 10, $U_{att}$ is an attractive potential that guides the vehicle 10 toward the nominal path 30 and $U_{rep}$ is a repulsive potential that guides the vehicle 10 away from obstacles in the environment. The objective of the vehicle 10 is to minimize the energy of this potential by commanding a steering torque input based on the negative gradient of the potential field:

$$-\nabla U_{(x)} = -\left[\frac{\partial U}{\partial x_1}(x), \frac{\partial U}{\partial x_2}(x)\right]^T. \quad (2)$$

The attractive potential $U_{att}$ may be generated around the nominal path 30, e.g., a center of a lane of travel, which may be obtained, for example, from a prior road network map or using a motion planner as is known. Given a nominal path 30 $\Pi$ as a sequence of N two-dimensional waypoints $\Pi = \omega_1, \ldots, \omega_N$, the attractive potentials $U_{att}(x)$ may be considered for all points x in a local neighborhood of the vehicle 10, of the form $$U_{att}(x) = d^i(x, \Pi), i \in \mathbb{N}, i > 0, \quad (3)$$

where $d(x, \Pi)$ is a distance from a point x to a closest segment in the nominal path 30 $\Pi$. Empirically, it has been determined that a quadratic potential, i.e., i=2 provides sufficient control authority to steer the vehicle 10 on the nominal path 30, whereas a linear potential (i=1) requires a high proportional gain on a feedback control system leading to instability. Further, it has been determined that higher orders (i>2) did not provide substantially improved performance compared to a quadratic potential. Based on this simplification, the potential may be defined as $$U_{att}(x) = d^2(x, \Pi). \quad (4)$$

The field potential in Equation 4 avoids local minima by having a zero valued centerline, is convex with respect to the lateral offset with respect to the nominal 30, and allows for straightforward calculation of derivatives even within obstacle regions.

Similarly, a quadratic potential $U_{rep}(x)$ in a vicinity of obstacles may be used. By adding the attractive and repulsive potentials, a total potential $U_{(x)} = U_{att} + U_{rep}$ may be obtained. According to equation 2, the potential function is defined as the negative norm of the gradient of the potential field, and is given by $$F(x) = -\|\nabla U_{(x)}\|. \quad (5)$$

The potential field 34 is specifically constructed to control the vehicle's steering controller 20 (leaving out longitudinal control). A degenerate case, where the driving corridor 32 is completely blocked by obstacles may be handled by a longitudinal controller 20, commanding the vehicle 10 to stop upon detecting that the driving corridor 32 is completely blocked.

Torque Based Steering Control

Based on empirical testing, it has been determined that a proportional, derivative (PD) feedback controller is sufficient to stabilize the field-based torque steering system for the vehicle 10. The PD controller may issue a torque command to the controller 20 as a function of the potential field 34. The control objective is to steer the vehicle 10 following the potential function in Eq. 5.

More precisely, the input variable to the controller 20 is the potential function, evaluated at a point $x_{t+L}$ located at a lookahead time L in the future $F_{(x_{t+L})}$, where $x_t$ is the position of a center of a rear axle of the vehicle 10 at a time t. Accordingly, the torque command at time t is given as $$\tau(t) = K_p F(x_{t+L}) + K_d \frac{d}{dt} F(x_{t+L}), \quad (6)$$

where $K_p$ is a proportional gain and $K_d$ is the derivative gain (tuning parameters). The lookahead time L may be a fixed time, e.g., 50 ms. Alternatively, the lookahead time may be determined based on data related to the vehicle 10 such as vehicle speed, and/or data related to the environment such as the type of road being traveled, traffic density, weather conditions, etc.

Figure 3:
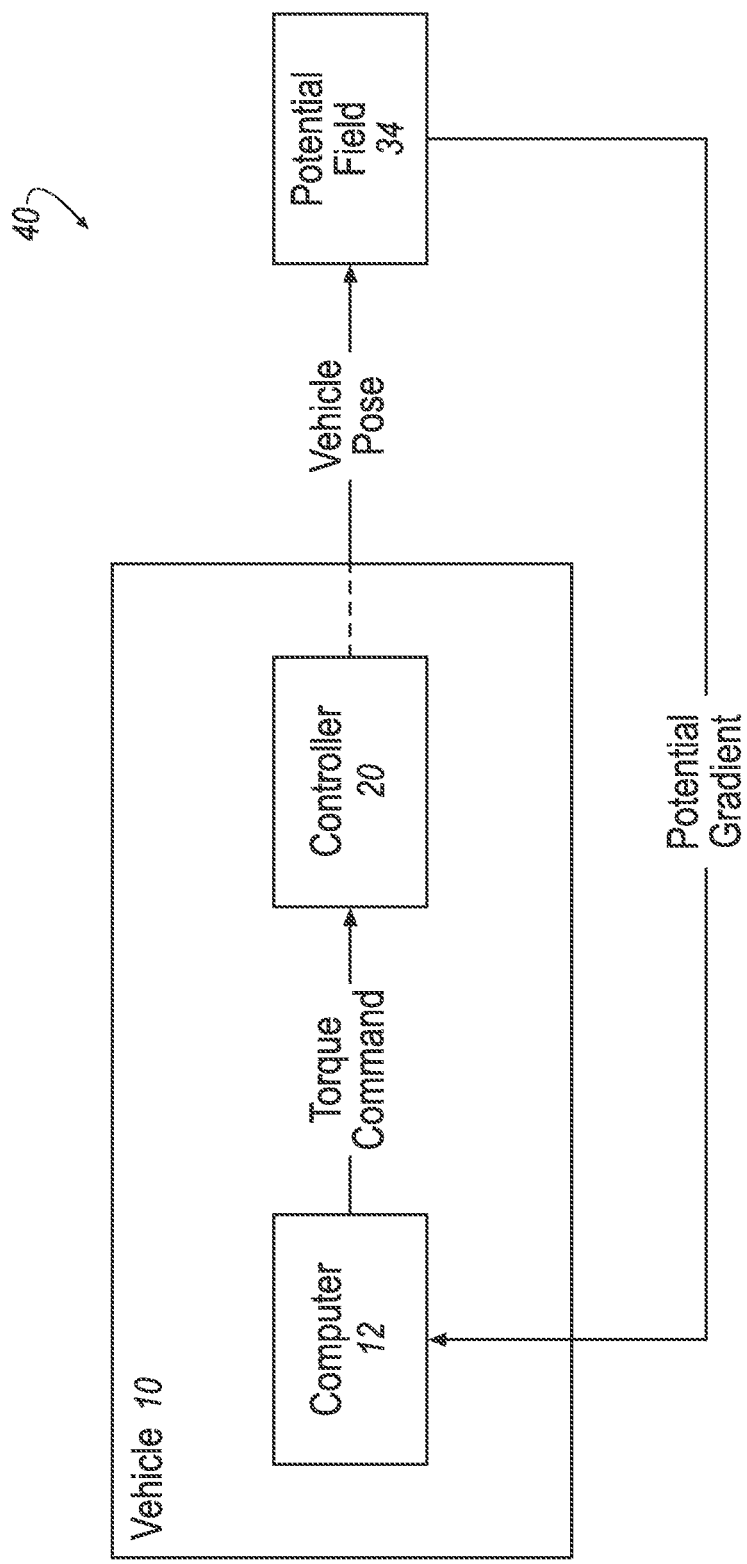
FIG. 3 is a diagram of an exemplary feedback control for a field-based torque steering system.

A block diagram of a field-based torque steering system 40 is shown in FIG. 3. As described above, the vehicle 10 includes the computer 12 and one or more controllers 20. The computer 12 is programmed to determine a torque command, based on a potential gradient as described in Equation 6. The computer 12 issues the torque command to the one or more controllers 20. The one or more controllers 20 include a torque steering controller 20. The torque steering controller adjusts a torque applied to a steering column of the vehicle 10, thereby adjusting a direction of travel of the vehicle 10.

The vehicle 10 continues to travel within the potential field 34. Based on a position x of the vehicle 10 within the potential field 34, an updated potential gradient is provided as an input to the computer 12 of the vehicle 10.

Exemplary Process Flow

Figure 4:
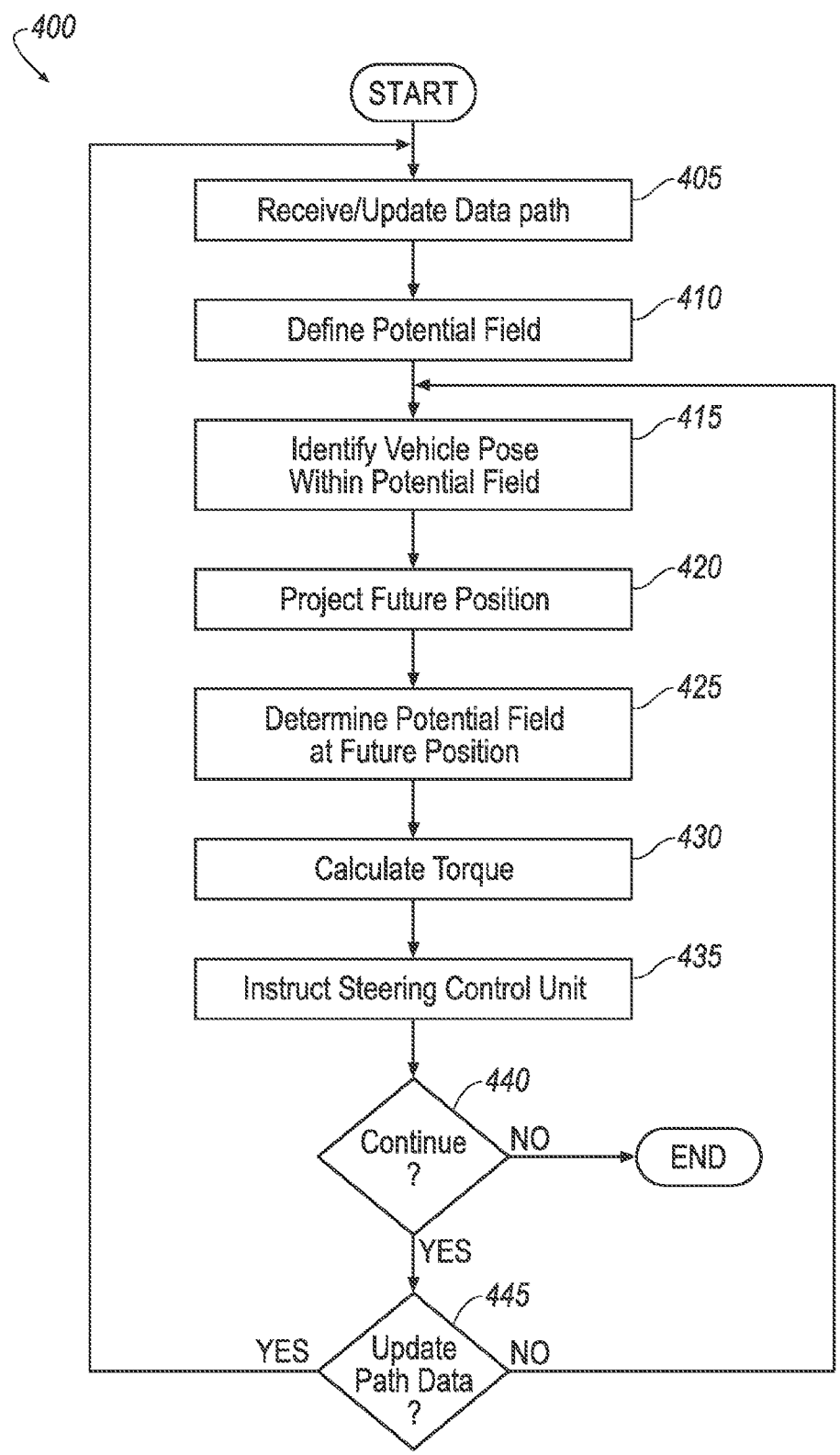
FIG. 4 is a diagram of an exemplary process for a field-based torque steering system.

FIG. 4 is a diagram of an exemplary process 400 for controlling the vehicle 10 using a field-based torque steering system 40. The process 400 starts in a block 405.

In the block 405, the computer 12 receives and/or updates path data for the vehicle 10. For example, at the beginning of a trip, the operator of vehicle 10 may input destination data for the trip via the user interface 18. The computer 12, based on the destination data may, e.g., retrieve maps from the route network definition file (RNDF) 16. The computer 12 may further retrieve current location data, e.g., from a global positioning system (GPS). Based on the destination data, the retrieved maps, and the current location data, the computer 12 may determine a nominal path 30 for the vehicle 10, as is known. The computer 12 may further identify known obstacles, e.g., for example, damaged sections of roadway, construction sites, etc., along the nominal path. Obstacle data may be retrieved from the RNDF 16, received from a GPS, received from vehicle-to-infrastructure (V2I) communications, received from vehicle-to-vehicle (V2V) communications, etc. The process 400 continues in a block 410.

In the block 410, the computer 12 may define a potential field 34 along the nominal path 30 as described above. The process 400 continues in a block 415.

In the block 415, the computer determines a pose of the vehicle 10 within the potential field 34. The pose may include a current position of the vehicle 10, a current velocity, a current direction of travel, a current acceleration, etc. The computer 12 may use, at least in part, GPS data to determine the pose of the vehicle 10. The computer 12 may further use data from data collectors 14, data from controllers 20, etc. to determine the pose of the vehicle 10. The process continues in a block 420.

In the block 420, the computer 12 projects, based on the pose at a current time, a future position of the vehicle after a predetermined lookahead time. As described above, the predetermined lookahead time may be a fixed time, e.g., 50 milliseconds (ms). Alternatively, the predetermined lookahead time may be based on vehicle 10 related data such as vehicle velocity, or data related to the travel environment such as type of roadway, traffic density, weather conditions, etc.

As described above, the computer 12 may project the future position to be equal to the current position plus a displacement equal to the product of the current velocity and the lookahead time along the current direction of travel. The process continues in a block 430.

In the block 430, the computer 12 calculates a torque to be applied to a steering column. As described above, the computer 12 calculates a potential function of the potential field 34 based on Equation 5.

$$F(x) = -\|\nabla U_{(x)}\| \quad (5)$$

The computer then calculates a torque to be applied to the steering column based on Equation 6.

$$\tau(t) = K_p F(x_{t+L}) + K_d \frac{d}{dt} F(x_{t+L}), \quad (6)$$

The process 400 then continues in a block 435.

In the block 435, the computer 12 sends an instruction to the controllers 20 and in particular to a torque steering controller 20. The torque steering controller adjusts a torque applied to the steering column of the vehicle 10. The vehicle 10 continues to travel along the nominal path 30. The process 400 continues in a block 440.

In the block 440, the computer 12 decides if the process 400 should continue. For example, the vehicle 10 may be continuing to travel along the nominal path 30, and have not yet arrived at the destination. In this case, the process 400 continues in a block 445.

Alternatively, the vehicle 10 may have, e.g., arrived at the destination, received input via the user interface 18 that the vehicle 10 should pull over, received instructions from the operator to convert to manual control, etc. In such cases, the computer 12 may determine that the process 400 should end.

In the block 445, the computer 12 determines if path data needs to be updated. For example, the computer 12 may have received input from the operator via the user interface 18 that the vehicle 10 should pursue a new destination, or follow a different route. Alternatively, the vehicle 10 may be proceeding along the nominal path 30, but that map data may need to be updated to account for progress along the nominal path 30. Still further, the vehicle 10 may have detected an obstacle along the nominal path 30, and need to update the map data to include the obstacle. In such cases, the process 400 may continue in the block 405.

In other cases, the progress along the nominal path 30 may have been incremental, and there may be no current need to update the map data. In this case, the process 400 may continue in the block 415.

Experimental Setup
Test Track

A test autonomous vehicle was equipped with the field-based torque steering system 40 as described above and tested using the vehicle dynamics area (VDA), steering and handling course (SHC) and low speed straightaway (LSSA) test surfaces. The VDA provides an open, paved surface for performing free-form steering tests. The SHC consists in a narrow two-lane road with sharp curves and pronounced slope changes. The LSSA consists in a two-lane loop with two long straightaways.

Test Vehicle

The autonomous vehicle used for the experiments was equipped with a drive-by-wire system featuring a steering interface that can be configured to accept torque requests, as described above. The steering interface can alternatively be configured to accept steering wheel angle (SWA) requests, comparable to systems currently known for autonomous vehicles. Equipping the vehicle 10 with both types of steering control systems permits comparing the performance of the two types steering control within the same test vehicle 10.

The test vehicle was equipped with four Velodyne HDL-32E 3D LIDAR scanners, an Applanix POS-LV 420 inertial navigation system (INS), GPS, and several other sensors. An onboard five-node computer cluster in the test vehicle performed all planning, control and perception for the system in substantially real-time. In particular, the proposed field-based torque steering control approach runs onboard the test vehicle at 20 Hz.

The test vehicle used maps of the area it operates on, which capture information about the environment such as LIDAR reflectivity and road height, and are used for localization, obstacle detection and other perceptual tasks. The road network is encoded as a metric-topological map using a derivative of the route network definition file (RNDF) format, providing information about the location and connectivity of road segments and lanes therein. Desired paths of travel can be obtained leveraging this prior knowledge.

Estimates over states of other traffic participants are provided by a dynamic object tracker running on the vehicle, which uses LIDAR range measurements, as is known. The geometry and location of static obstacles are also inferred on board using LIDAR measurements.

Test Results

Evaluation results for the test autonomous vehicle, equipped with a field-based test torque steering system, are presented below. Initially, straight line maneuvers and free-form steering maneuvers with increasing curvature were performed on the VDA surface. These tests were performed at low speed (~4 m/s). Several test runs were then performed on the SHC, moving at speeds up to 7 m/s. Finally, several test runs were performed with maneuvers involving the presence of obstacles (i.e., involving potential fields with obstacle components) again on the VDA at lower speeds.

Initial Tests

Initially, several free-form steering trails were performed on the VDA surface and following of straight line paths on the LSSA. The field-based torque steering system successfully steered the test vehicle along a nominal path using an associated potential field. The nominal path included several different curvatures, and all were tracked at a constant longitudinal speed of 4 m/s.

Figure 2:
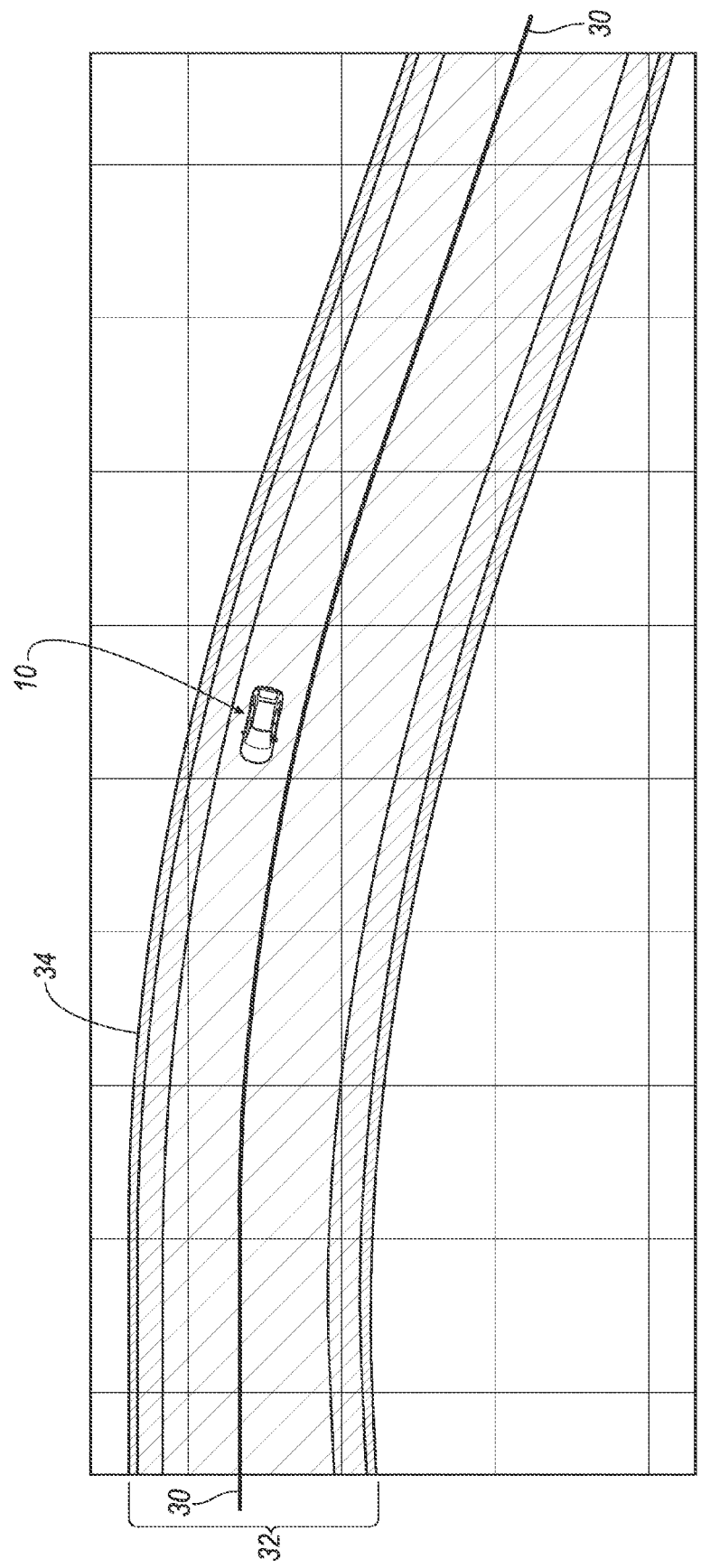
FIG. 2 is a diagram of the exemplary vehicle of FIG. 1 on a roadway including a representation of a potential field.

FIG. 2, discussed earlier, illustrates one test result. As can be seen the test vehicle incurred an offset from the potential field's zero curve (along the nominal path). However, it is an acceptable zone of the potential field for the test vehicle to navigate on, which allows the test vehicle to navigate the curve following a relaxed curve, taking advantage of permissible deviations from the nominal path.

Steering and Handling Course

Tests were performed on the SHC to test the field-based torque steering system and to compare it to a SWA-based steering controller following the same nominal path along the course. The SWA-based controller uses a kinematic model of the test vehicle to command a SWA value to track the nominal path 30 with minimum cross-track error, operating in way similar to a pure pursuit path tracking algorithm. The performance of field-based torque steering system is compared to the SWA controller in terms of the torque applied to the steering system, and in terms of path tracking error and control effort.

Figure 5:
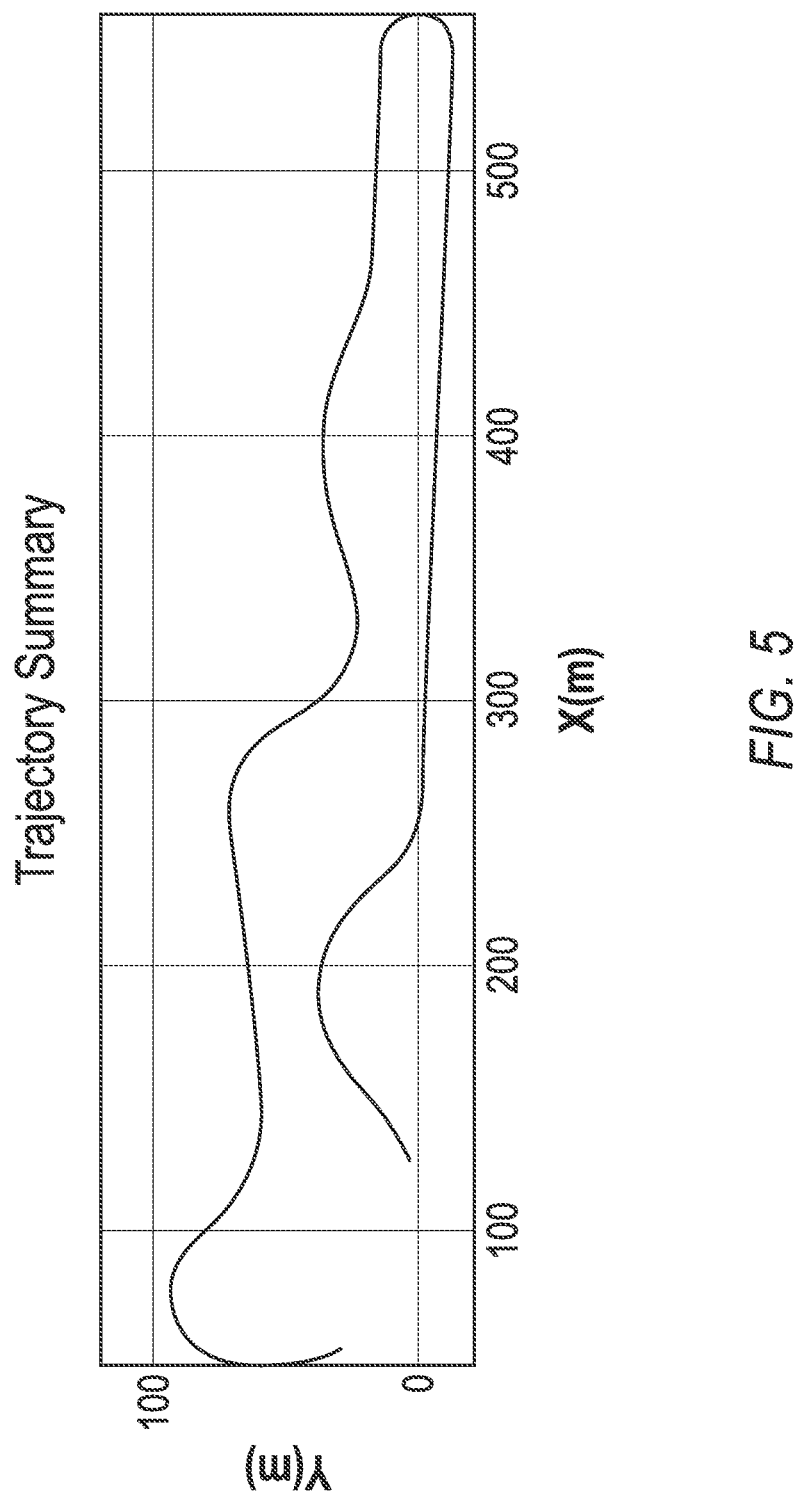
FIG. 5 is a diagram of a test trajectory for testing an exemplary field-based torque steering system.
Figure 6B:
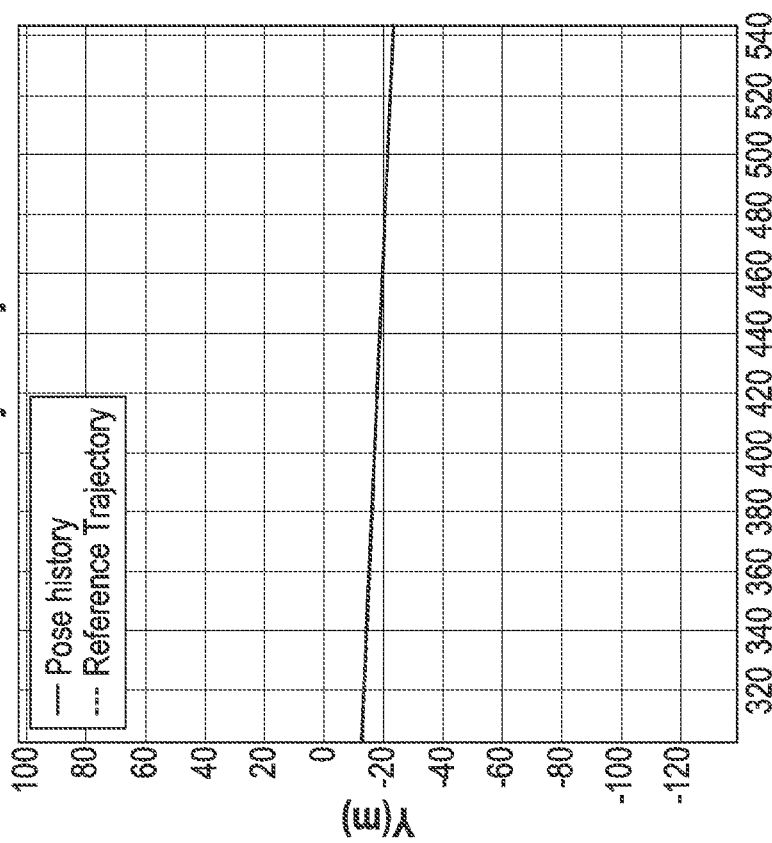
FIG. 6B is a graph indicating a vehicle trajectory during a second portion of the test of the exemplary field-based torque steering system indicated in FIG. 6A.
Figure 6A:
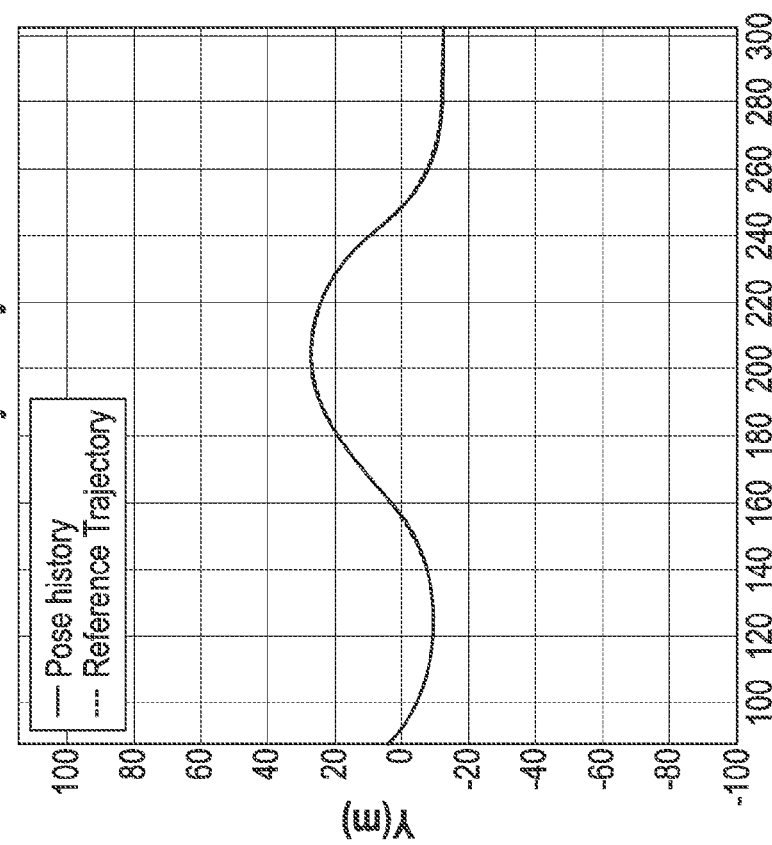
FIG. 6A is a graph indicating a vehicle trajectory during a first portion of a test of an exemplary field-based torque steering system.
Figure 6D:
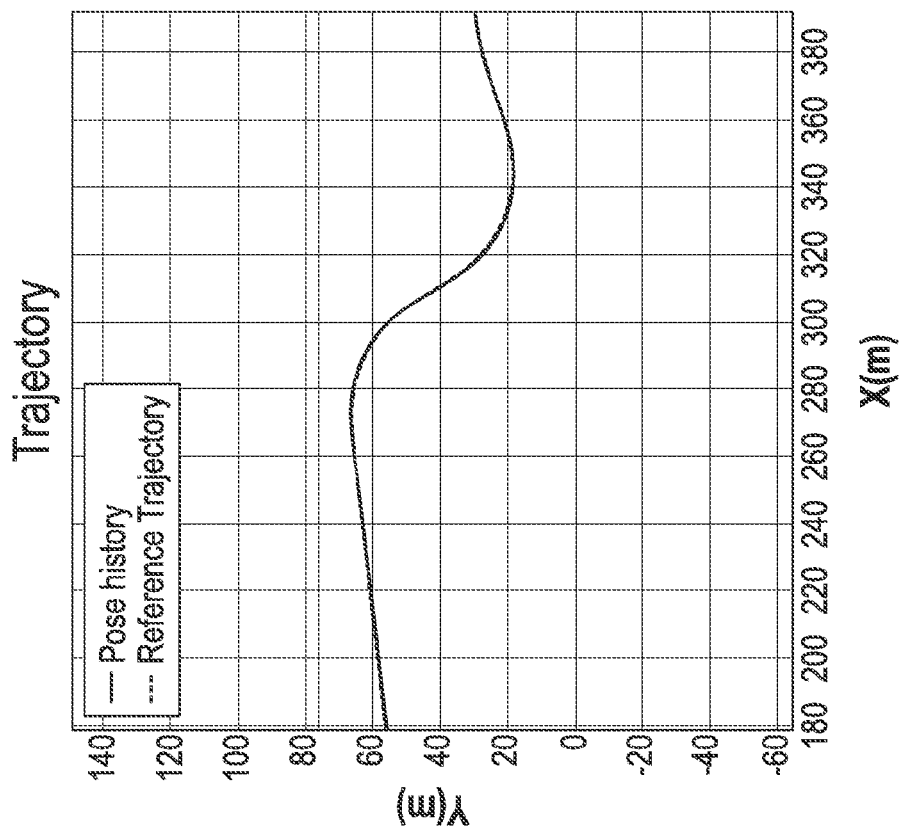
FIG. 6D is a graph indicating a vehicle trajectory during a fourth portion of the test of the exemplary field-based torque steering system indicated in FIGS. 6A, 6B and 6C.
Figure 6C:
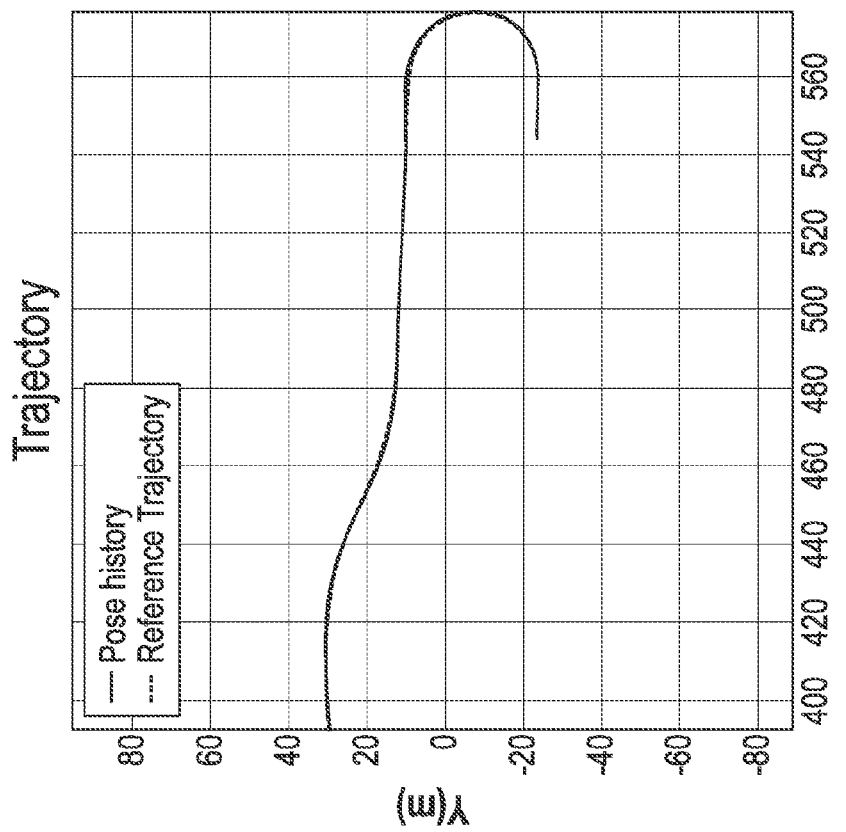
FIG. 6C is a graph indicating a vehicle trajectory during a third portion of the test exemplary field-based torque steering system indicated in FIGS. 6A and 6B.
Figure 6E:
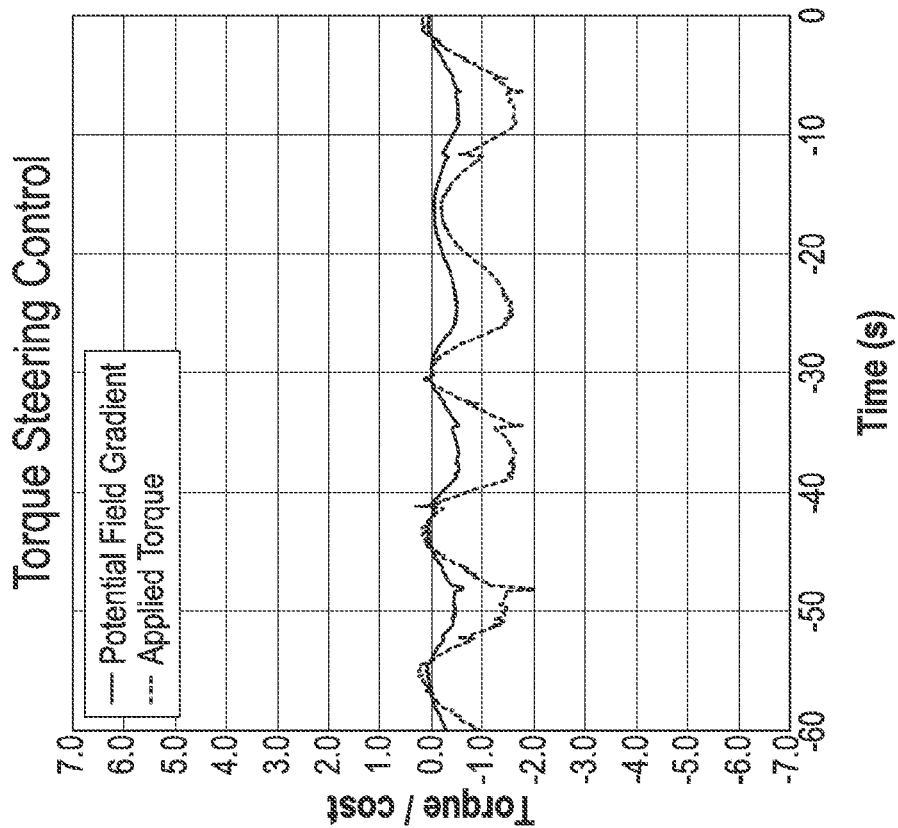
FIG. 6E is a graph indicating potential field gradient and applied torque during the first portion of the test corresponding to the vehicle trajectory of FIG. 6A.
Figure 6F:
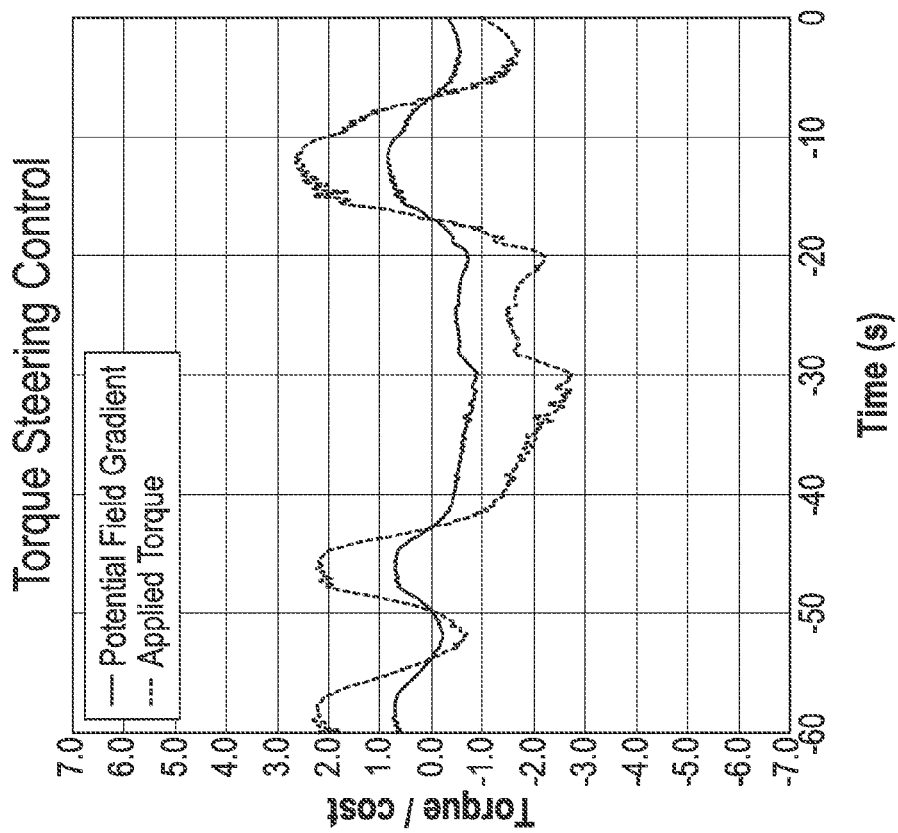
FIG. 6F is a graph indicating potential field gradient and applied torque during the portion of the test corresponding to the vehicle trajectory of FIG. 6B.
Figure 6H:
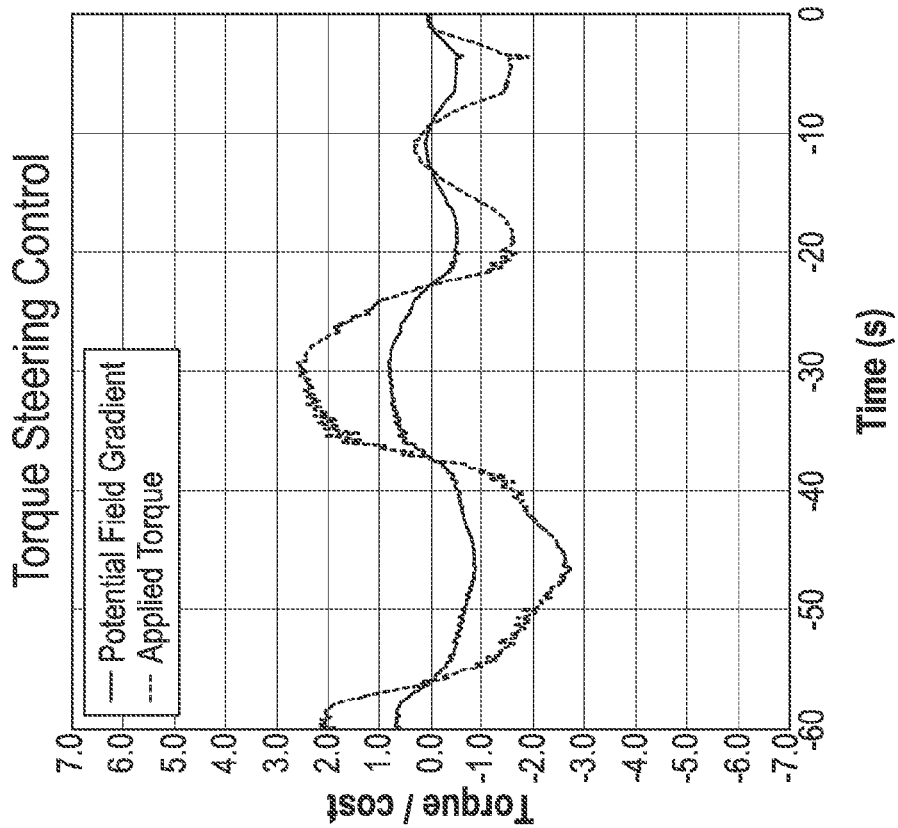
FIG. 6H is a graph indicating potential field gradient and applied torque during the fourth portion of the test corresponding to the vehicle trajectory of FIG. 6D.
Figure 6G:
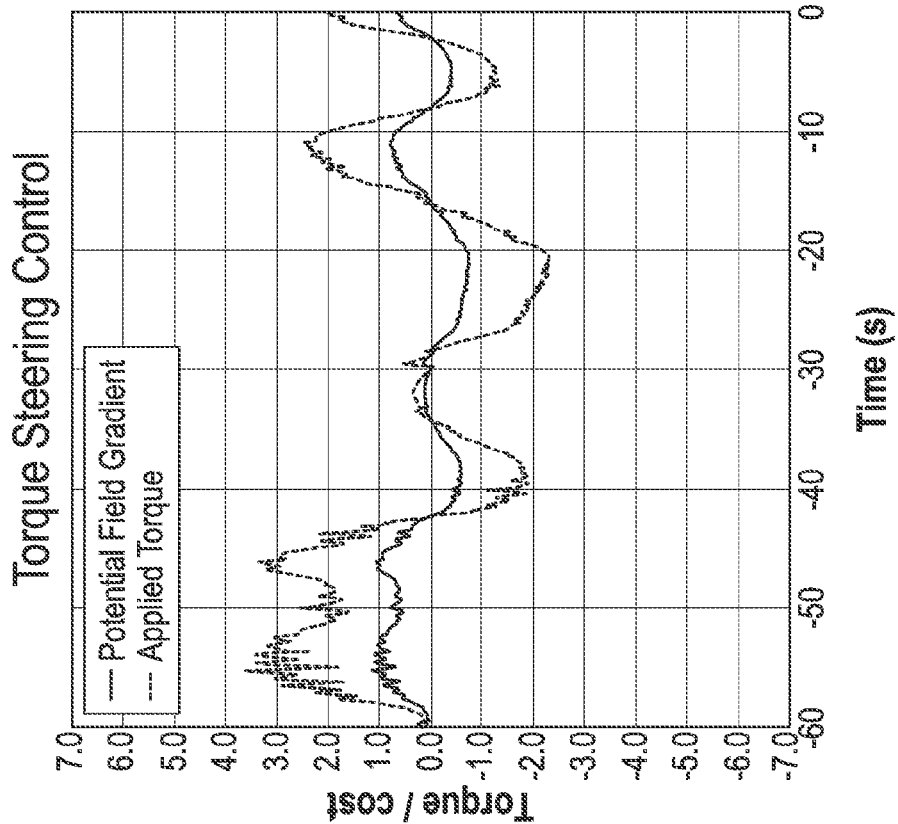
FIG. 6G is a graph indicating potential field gradient and applied torque during the third portion of the test corresponding to the vehicle trajectory of FIG. 6C.
Figure 7B:
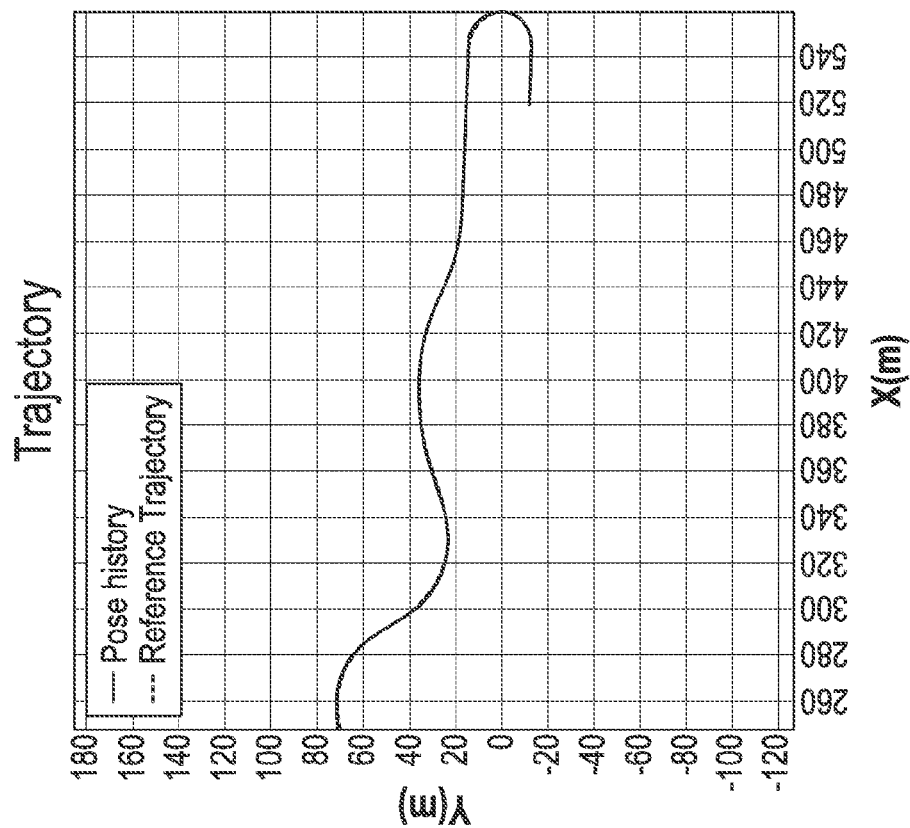
FIG. 7B is a graph indicating a vehicle trajectory during a second portion of the test of the steering wheel angel (SWA) steering system indicated in FIG. 7A.
Figure 7A:
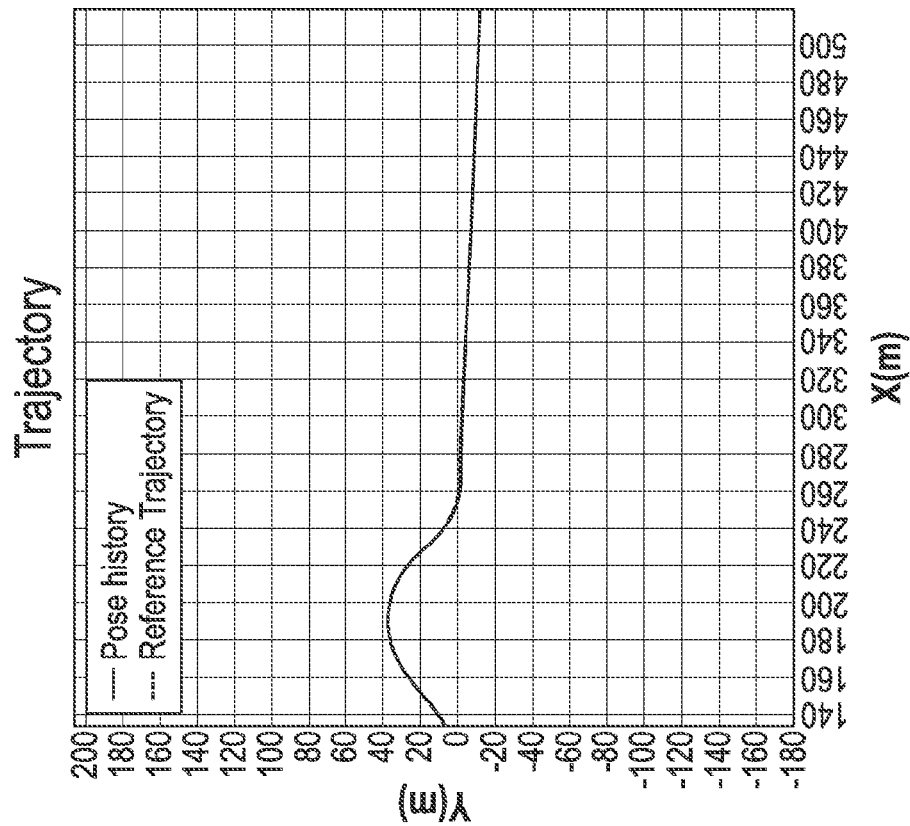
FIG. 7A is a graph indicating a vehicle trajectory during a first portion of a test of a steering wheel angle (SWA) steering system.
Figure 7C:
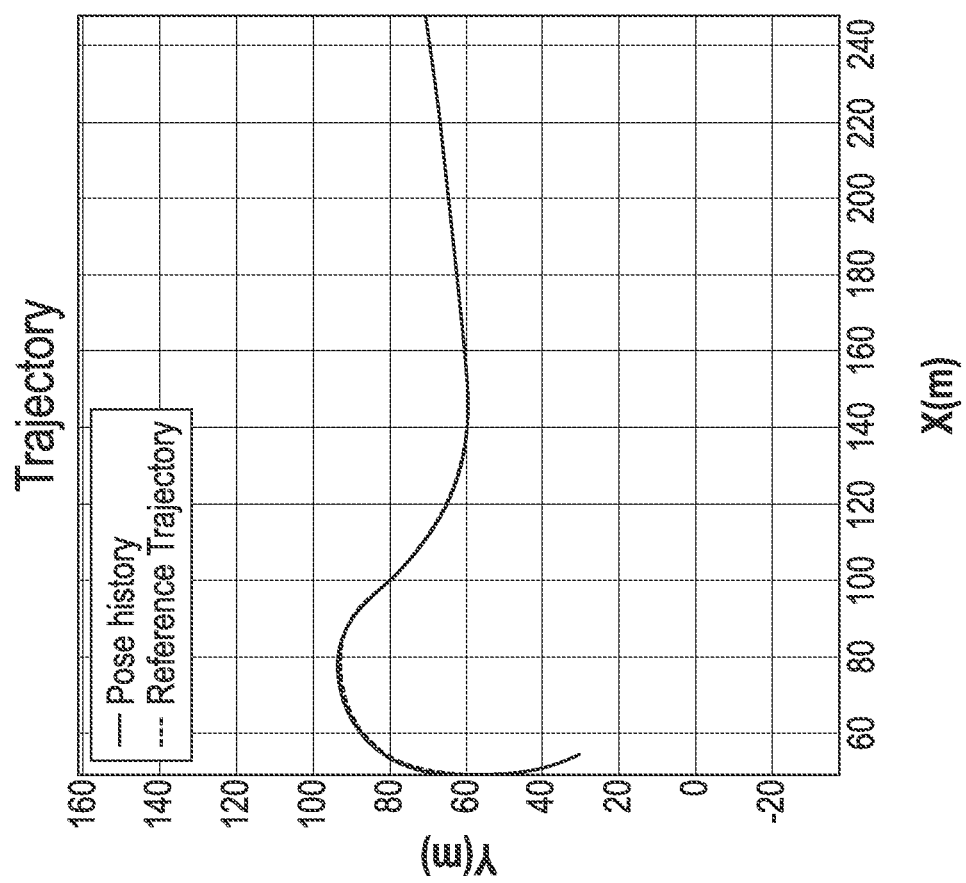
FIG. 7C is a graph indicating a vehicle trajectory during a third portion of the test of the steering wheel angel (SWA) steering system indicated in FIGS. 7A and 7B.
Figure 7E:
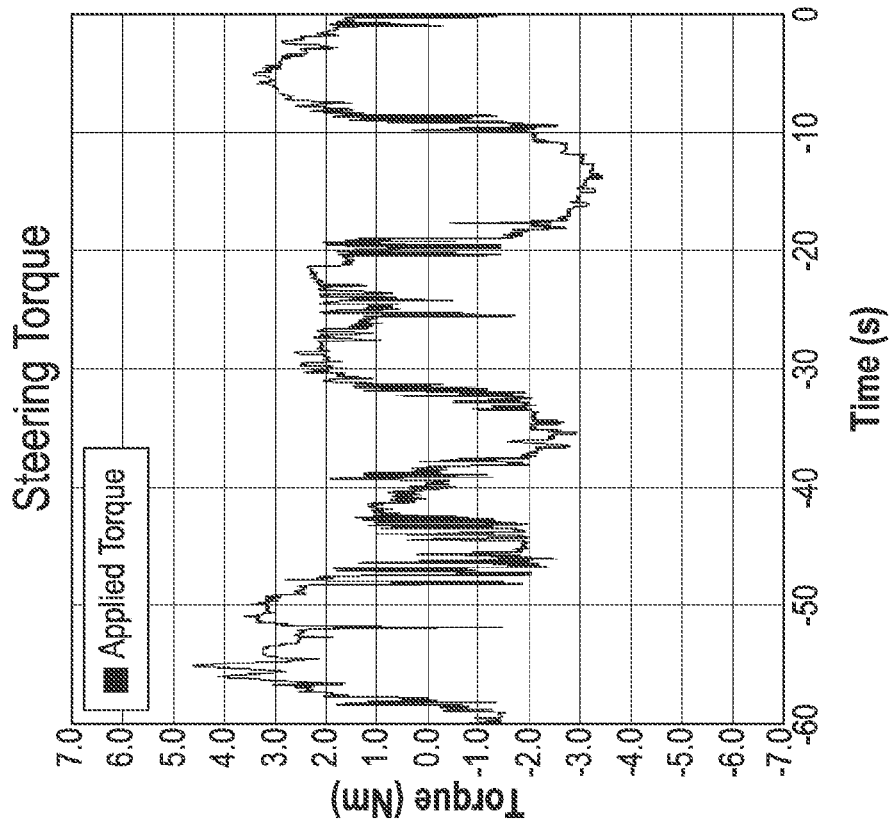
FIG. 7E is a graph indicating applied torque during the second portion of the test of the steering wheel angle (SWA) steering system corresponding to the vehicle trajectory of FIG. 7B.
Figure 7D:
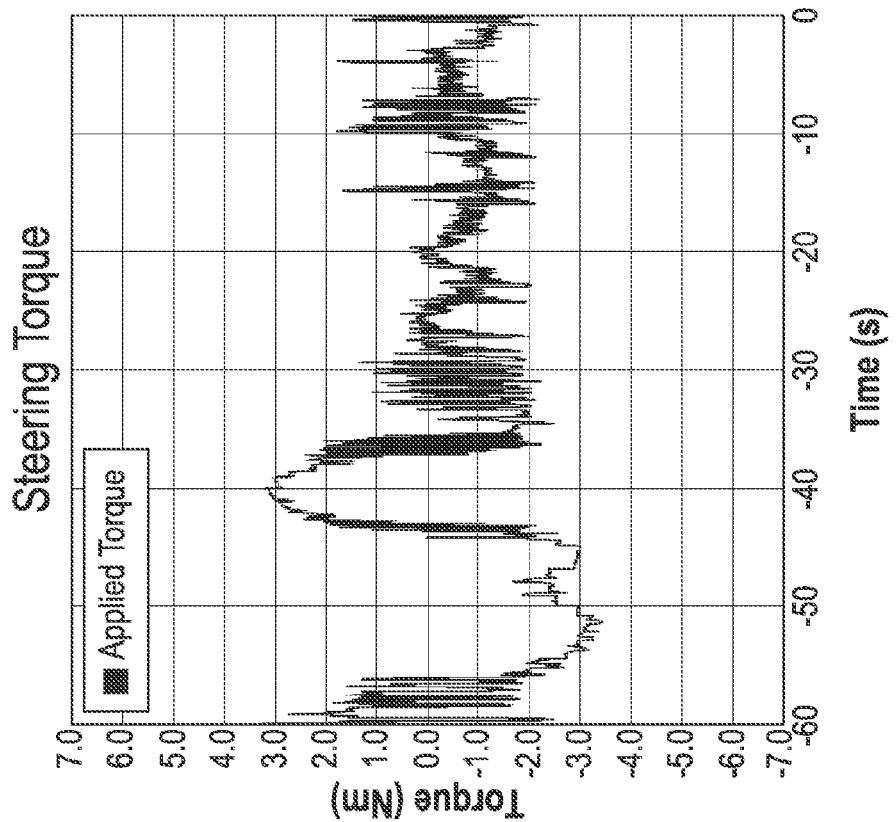
FIG. 7D is a graph indicating applied torque during the first portion of the test of the steering wheel angle (SWA) steering system corresponding to the vehicle trajectory of FIG. 7A.
Figure 7F:
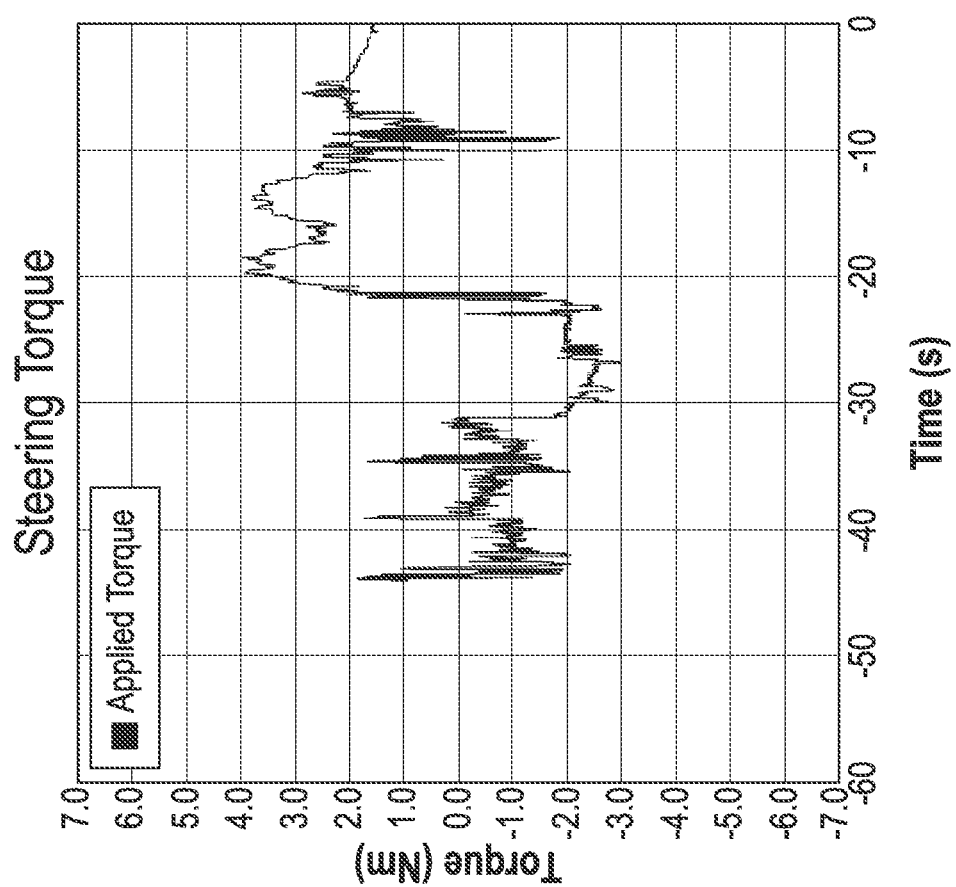
FIG. 7F is a graph indicating applied torque during the third portion of the test of the steering wheel angle (SWA) steering system corresponding to the vehicle trajectory of FIG. 7C.

FIG. 5 illustrates a test trajectory followed by the test vehicle on one of the experimental runs. FIGS. 6A-6H show the performance of the field-based torque steering system in terms of the input signal to the controller, $\nabla F_t(x_{t+L})$, and the output (torque applied to the steering system). By contrast, FIGS. 7A-7F illustrate the torque applied by the SWA-based controller.

It can be observed that the field-based torque steering system produces some low frequency oscillations in the torque signal, but the steering behavior from an operator's perspective does not differ qualitatively from that typical of a human driver. Conversely, as a result of rigidly seeking to lock the wheel at a particular angle, the SWA-based controller exerts a very high-frequency torque on the steering system.

A quantitative comparison of the performance of the field-based torque steering system and the SWA-based controller in terms of path tracking error and control effort is presented below. The path tracking error is computed as the signed distance between the vehicle's position and the closest segment in the nominal path, being positive if the vehicle lays to the right of the path and negative otherwise. The control effort is given as the amount of work done by the actuator:

$$W = \int_{t_0}^{t_f} |\tau(t)| d\theta [J]. \quad (7)$$

where $\tau(t)$ is the torque applied to the vehicle's steering system at time t, $t_0$ and $t_f$ are the start and end instants of the run, respectively, and $\theta$ is the steering column angle.

Figure 8B:
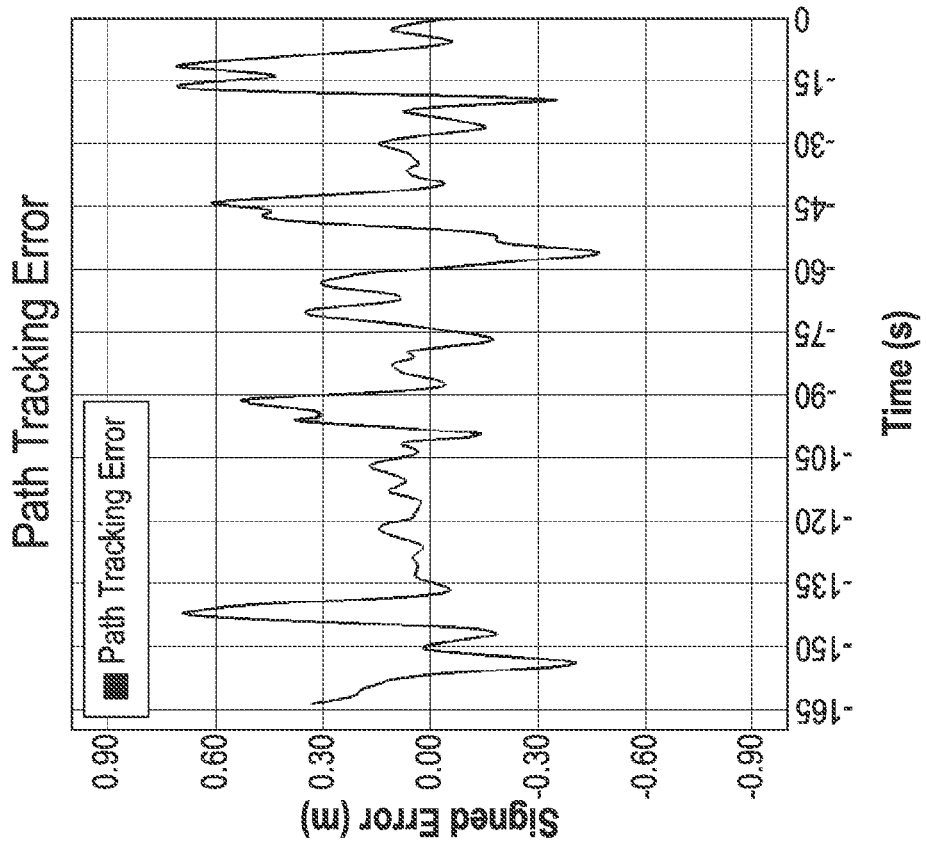
FIG. 8b is a graph indicating the tracking performance of an SWA steering system.
Figure 8A:
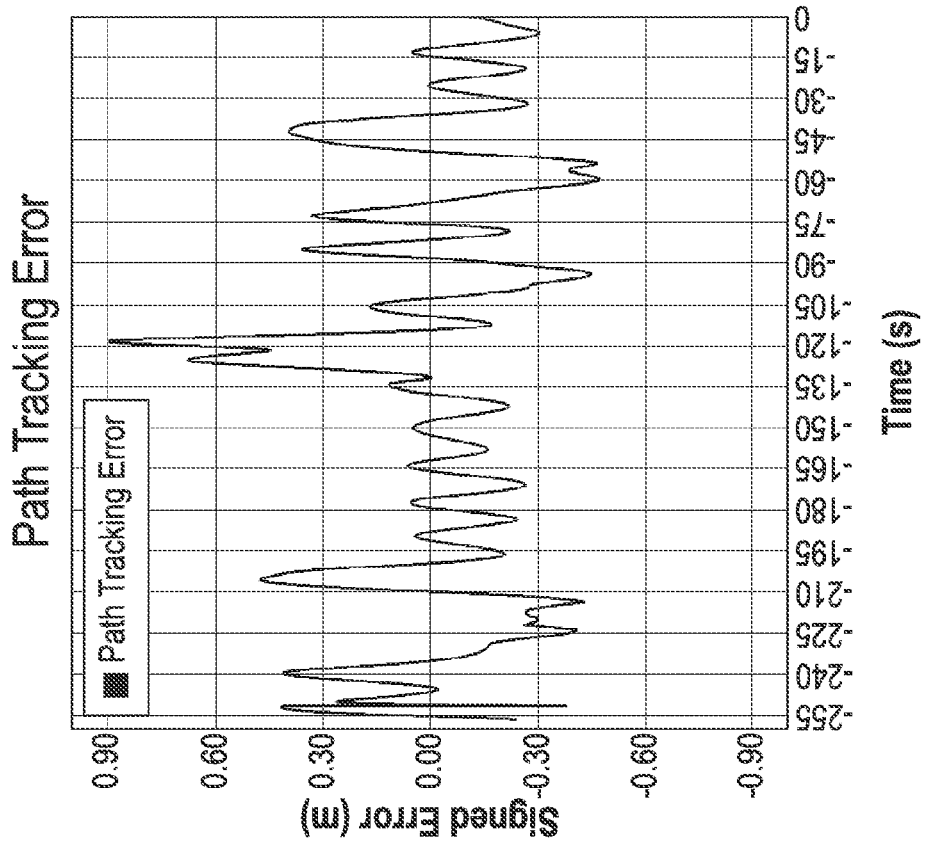
FIG. 8a is a graph indicating the tracking performance of a field-based torque steering system.
Figure 9:
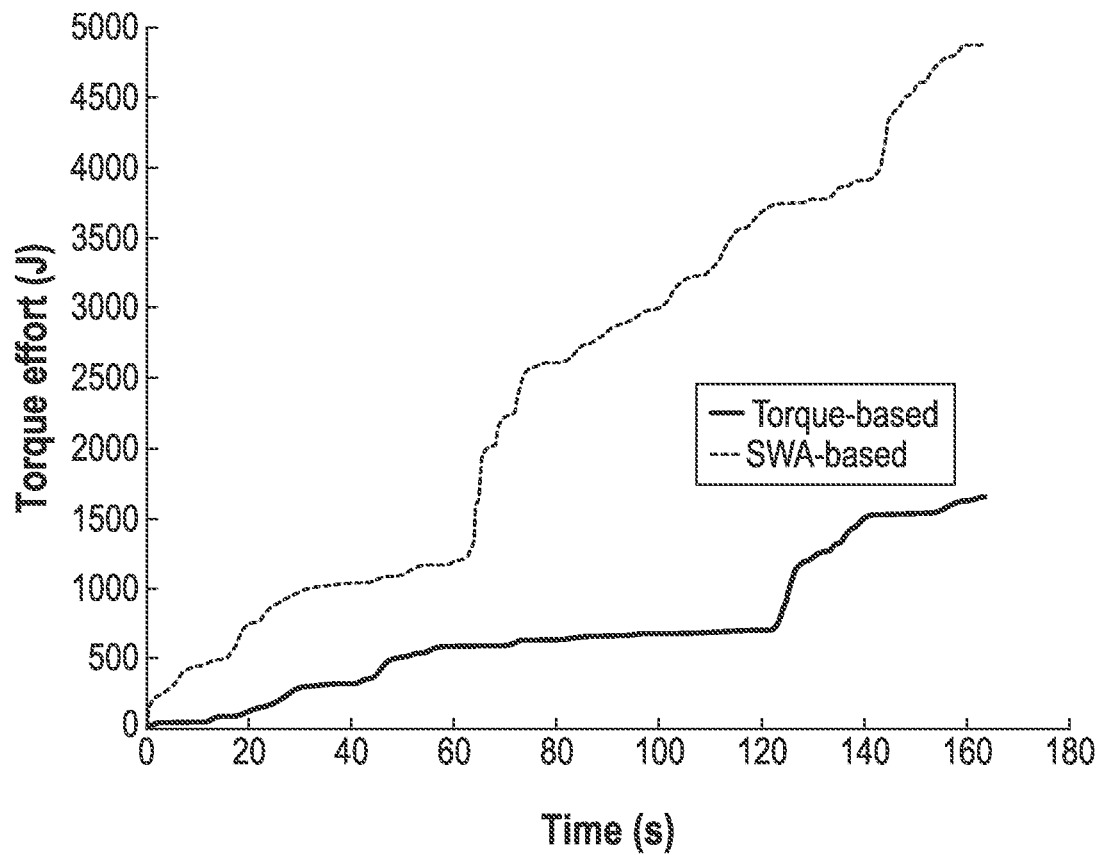
FIG. 9 is a graph indicating the total work (in Joules) of a field-based torque steering system and a SWA steering system.

FIG. 8a shows the path tracking error along a typical test run for the test torque control system and FIG. 8b shows the path tracking error along the same path for the SWA-based controller. FIG. 9 shows the control effort. Due to differing longitudinal speeds, the trajectories have different durations: the trajectory traced by the torque based controller lasts 255 s and the trajectory traced by the SWA-based controller lasts 160 seconds (s). However, the nominal path 30 is the same for bother controllers and therefore the test places the same challenge to both approaches in terms of steering.

Regarding path tracking error, both controllers offer a similar performance, operating within 30 cm accuracy for most of the trajectory. The field-based torque steering system presents a noticeable peak at just fewer than 90 centimeter (cm) tracking error at half way through the trajectory, when passing through a tight hairpin curve. This occurs because a very large steering effort is required in that area. The field-based torque steering system trades off tracking precision for smoother steering behavior. However, the SWA-based controller likewise presents high peaks well above 60 cm error.

Regarding torque effort, however, the field-based torque steering system accumulates approximate 1500 J (Joules) during the run. The SWA-based controller requires more than 4500 J of work. This significant difference evidences the smoother steering behavior of the torque based control system.

Incorporating Obstacles on the Potential Field

Figure 10:
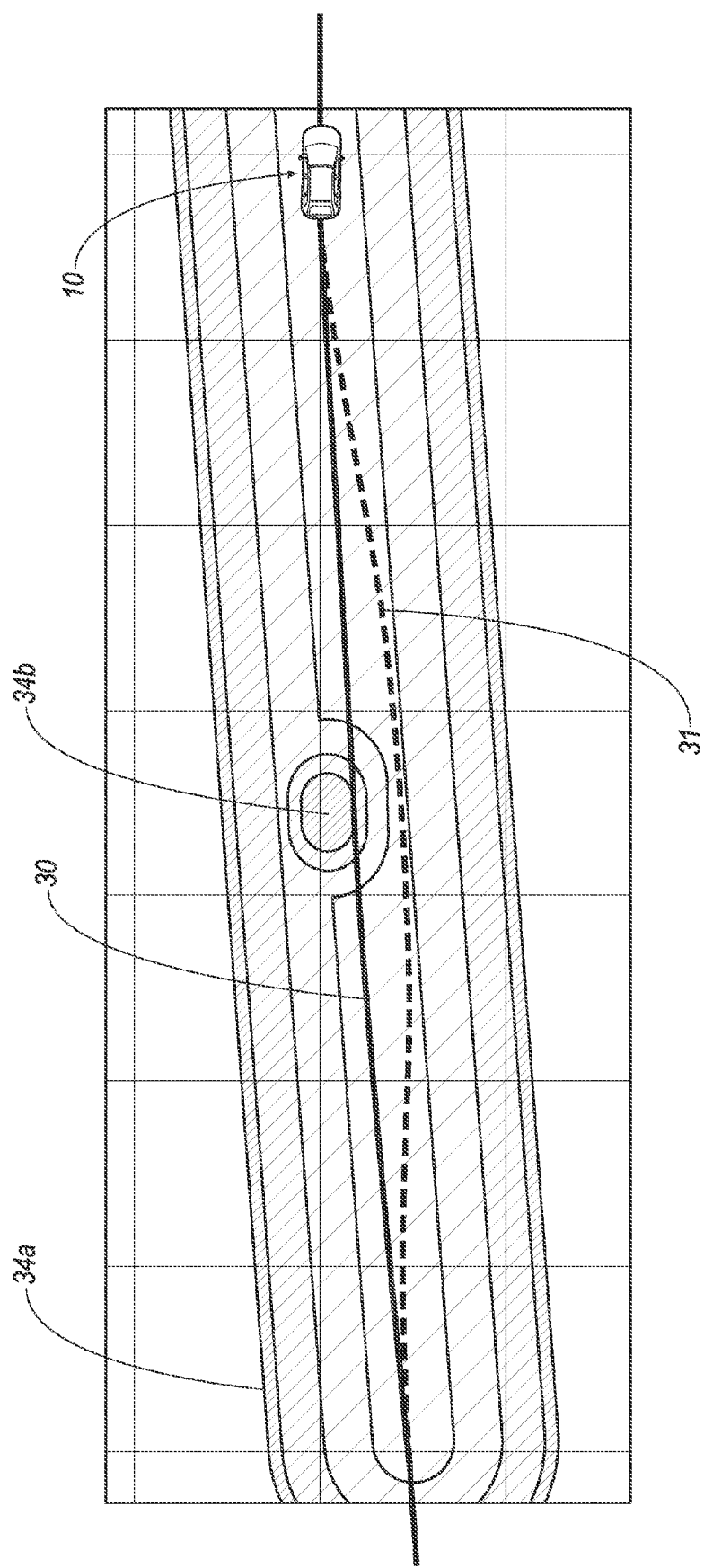
FIG. 10 is a diagram of an the exemplary vehicle with field-based steering control on a roadway including a first potential field along a nominal path and a second potential field associated with an obstacle.

As discussed above, obstacles can be incorporated as a repulsive potential during the construction of the potential field. This may eliminate the need to explicitly calculate/update the nominal path to include an identified obstacle. FIG. 10 illustrates a test run of the VDA surface where a static obstacle to the left of the vehicle's nominal path. The computer 12 defines a first potential field 34a around the nominal path as described above. The computer 12 further defines a second potential field 34b, around the static object. The combined potential fields 34a, 34b lead the vehicle 10 to smoothly circumvent the obstacle, along a travelled path 31.

CONCLUSION

As used herein, the adverb "substantially" means that a shape, structure, measurement, quantity, time, etc. may deviate from an exact described geometry, distance, measurement, quantity, time, etc., because of imperfections in materials, machining, manufacturing, etc.

The term "exemplary" is used herein in the sense of signifying an example, e.g., a reference to an "exemplary widget" should be read as simply referring to an example of a widget.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system comprising:
    a computer including a processor and a memory, the memory storing instructions executable by the processor such that the computer is programmed to:
        determine, along a nominal path to be traversed by a vehicle, a potential field representing a driving corridor for the vehicle, the potential field including an attractive potential that guides the vehicle to remain within the corridor;
        identify a first position of the vehicle relative to the potential field at a current time;
        calculate a torque to apply to a steering column based at least in part on the first position relative to the potential field; and
        apply the torque to the steering column of the vehicle.

2. The system of claim 1, wherein the computer is programmed to increase the attractive potential as a first distance from the first position to the nominal path increases.

3. The system of claim 2, wherein a first relationship between the attractive potential and the first distance is quadratic.

4. The system of claim 1, wherein the potential field is defined such that the nominal path is at a proximate center of the potential field, along a direction of travel.

5. The system of claim 1, wherein the computer is further programmed to:
    identify a second position relative to the potential field, the second position indicating a projected future position of the vehicle a first predetermined time period after the current time, wherein determining the torque to be applied to the steering column of the vehicle is based at least in part on the second position.

6. The system of claim 5, wherein the applied torque is determined based in part on a first direction of travel of the vehicle and a first velocity of the vehicle, and the computer is further programmed to calculate the second position to be equal to the first position plus a first displacement equal to the product of the first velocity and the first predetermined time period along the first direction of travel.

7. The system of claim 1, wherein the potential field further includes a repulsive potential, the repulsive potential guiding the vehicle away from an object within a predetermined distance of the nominal path.

8. The system of claim 7, wherein the computer is further programmed to:
    calculate the repulsive potential based on a second distance of the vehicle from the object.

9. The system of claim 8, wherein the repulsive potential increases as the second distance decreases.

10. The system of claim 7 wherein the potential field is a sum of the attractive potential field and the repulsive potential field.

11. The system of claim 1, wherein the computer is further programmed to:
    calculate a negative gradient $$-\nabla U_{(x)} = -DU_{(x)} = -\left[\frac{\partial U}{\partial x_1}(x), \frac{\partial U}{\partial x_2}(x)\right]^T;$$

and
    determine the torque in part based on the negative gradient;
    wherein $U_{(x)}$ is the potential field at a location x on a two dimensional plane.

12. The system of claim 11, wherein the computer is further programmed to:
    determine the torque $$\tau(t) = K_p F(x_{t+L}) + K_d \frac{d}{dt} F(x_{t+L});$$

wherein:
    $F(x_{t+L})$ is the negative gradient of the potential field at a projected future location $x_{t+L}$;
    t is a current time;
    L is a predetermined time period;
    $K_p$ is a proportional gain; and
    $K_d$ is a derivative gain.

13. A method comprising:
    determining, by a computer, along a nominal path to be traversed by a vehicle, a potential field representing a driving corridor for the vehicle, the potential field including an attractive potential that guides the vehicle to remain within the corridor;
    identifying a first position of the vehicle relative to the potential field at a current time;
    calculating a torque to apply to a steering column based at least in part on the first position; and
    applying the torque to the steering column of the vehicle.

14. The method of claim 13, wherein the computer is programmed to increase the attractive potential as a first distance from the first position to the nominal path increases.

15. The method of claim 14, wherein a first relationship between the attractive potential and the first distance is quadratic.

16. The method of claim 13, wherein the potential field is defined such that the nominal path is at a proximate center of the potential field, along a direction of travel.

17. The method of claim 13, further comprising:
identifying a second position relative to the potential field, the second position indicating a projected future position of the vehicle a first predetermined time period after the current time, wherein determining the torque to be applied to the steering column of the vehicle is based at least in part on the second position.

18. The method of claim 17, wherein the applied torque is determined based in part on a first direction of travel of the vehicle and a first velocity of the vehicle, and the computer is further programmed to calculate the second position to be equal to the first position plus a first displacement equal to the product of the first velocity and the first predetermined time period along the first direction of travel.

19. The method of claim 13, wherein the potential field further includes a repulsive potential, the repulsive potential guiding the vehicle away from an object within a predetermined distance of the nominal path.

20. The method of claim 19, further comprising:
calculating the repulsive potential based on a second distance of the vehicle from the object.

21. The method of claim 20, wherein the repulsive potential increases as the second distance decreases.

22. The method of claim 19 wherein the potential field is a sum of the attractive potential field and the repulsive potential field.

23. The method of claim 13, further comprising:
calculating a negative gradient $$-\nabla U_{(x)} = -DU_{(x)} = -\left[\frac{\partial U}{\partial x_1}(x), \frac{\partial U}{\partial x_2}(x)\right]^T;$$

and
determining the torque in part based on the negative gradient;
wherein $U_{(x)}$ is the potential field at a location x on a two dimensional plane.

24. The method of claim 23, further comprising:
determining the torque $$\tau(t) = K_p F(x_{t+L}) + K_d \frac{d}{dt} F(x_{t+L});$$

wherein:
$F(x_{t+L})$ is the negative gradient of the potential field at a projected future location $x_{t+L}$;
t is a current time;
L is a predetermined time period;
$K_p$ is a proportional gain; and
$K_d$ is a derivative gain.

* * * * *